(12) United States Patent  
Zaarour et al.

(10) Patent No.: US 12,124,470 B2  
(45) Date of Patent: Oct. 22, 2024

(54) SYSTEMS AND METHODS FOR MULTIPLEXING AND DE-MULTIPLEXING DATA EVENTS OF A PUBLISHING PLATFORM

(71) Applicant: Google LLC, Mountain View, CA (US)

(72) Inventors: Charbel Zaarour, Woodinville, WA (US); Stephen Paul Ganem, Huntington Beach, CA (US); Loc Thi Bao Do, Irvine, CA (US); Eric Joshua Burley, Irvine, CA (US)

(73) Assignee: GOOGLE LLC, Mountain View, CA (US)

( * ) Notice: Subject to any disclaimer, the term of this patent is extended or adjusted under 35 U.S.C. 154(b) by 47 days.

(21) Appl. No.: 17/911,068

(22) PCT Filed: Jan. 22, 2021

(86) PCT No.: PCT/IB2021/050509  
§ 371 (c)(1),  
(2) Date: Sep. 12, 2022

(87) PCT Pub. No.: WO2022/008981  
PCT Pub. Date: Jan. 13, 2022

(65) Prior Publication Data  
US 2023/0111106 A1    Apr. 13, 2023

(30) Foreign Application Priority Data

Jul. 9, 2020    (VN) .............................. 1-2020-03990

(51) Int. Cl.  
*G06F 17/00* (2019.01)  
*G06F 16/25* (2019.01)  
*H04L 67/12* (2022.01)

(52) U.S. Cl.  
CPC ............ *G06F 16/252* (2019.01); *H04L 67/12* (2013.01)

(58) Field of Classification Search  
CPC ........ G06F 16/13; G06F 16/24; G06F 16/156; G06N 3/00; G06N 5/00; G05B 13/00  
See application file for complete search history.

(56) References Cited

U.S. PATENT DOCUMENTS 5,920,338 A * 7/1999 Katz ................ G08B 13/19673  
348/161  
6,829,717 B1 * 12/2004 Roust ........................ G06F 1/04  
370/506

(Continued)

FOREIGN PATENT DOCUMENTS

| JP | 2004/272541 | 9/2004 |
| JP | 2010/113542 | 5/2010 |
| JP | 2016/167168 | 4/2020 |

OTHER PUBLICATIONS

International Preliminary Report on Patentability for Application No. PCT/US2021/050509, mailed Jan. 19, 2023, 10 pages.

(Continued)

*Primary Examiner* — Hung D Le  
(74) *Attorney, Agent, or Firm* — DORITY & MANNING P.A.

(57) ABSTRACT

Systems, methods, and computer readable storage media that may be used to receive, by a publishing platform, one or more first data events associated with first content of a first content provider and one or more second data events associated with second content of a second content provider, generate, by the publishing platform, multiplexed data by multiplexing the one or more first data vents and the one or more second data events, and communicate, by the publishing platform, the multiplexed data to a de-multiplexer of an analytics system, wherein the de-multiplexer de-multiplexes (Continued)

the multiplexed data into the one or more first data events and the one or more second data events, communicates the one or more first data events to a first endpoint associated with the first content provider, and communicates the one or more second data events to a second endpoint associated with the second content provider.

20 Claims, 7 Drawing Sheets

(56) References Cited

U.S. PATENT DOCUMENTS

| | | | | |
|---|---|---|---|---|
| 7,321,956 B2* | 1/2008 | Gschwind | ........... | G06F 12/0817 |
| | | | | 711/E12.027 |
| 7,363,432 B2* | 4/2008 | Gschwind | ........... | G06F 12/0824 |
| | | | | 711/147 |
| 10,057,661 B2* | 8/2018 | Champel | ............... | H04L 65/612 |
| 10,664,509 B1 | 5/2020 | Reeves et al. | | |
| 2003/0095574 A1* | 5/2003 | Zimmermann | .. | H04N 21/43072 |
| | | | | 375/E7.278 |
| 2003/0123702 A1* | 7/2003 | Colmenarez | ..... | G08B 13/19645 |
| | | | | 348/E7.086 |
| 2005/0051713 A1* | 3/2005 | Halmos | ................... | G01S 7/483 |
| | | | | 342/25 R |
| 2009/0109071 A1* | 4/2009 | Hazzard | ................. | H03M 9/00 |
| | | | | 341/100 |
| 2010/0064044 A1 | 3/2010 | Nonoyama | | |
| 2012/0278843 A1* | 11/2012 | Carmichael | ............ | H04H 20/74 |
| | | | | 725/67 |
| 2015/0172320 A1* | 6/2015 | Colombo | .............. | H04L 63/105 |
| | | | | 726/1 |
| 2017/0006316 A1* | 1/2017 | Hwang | .............. | H04N 21/2362 |
| 2018/0084300 A1* | 3/2018 | Greene | ............. | H04N 21/6332 |
| 2018/0131995 A1* | 5/2018 | Stransky-Heilkron | ..................... | |
| | | | | H04N 21/8186 |
| 2018/0218392 A1 | 8/2018 | Slain | | |
| 2018/0241852 A1* | 8/2018 | Maluf | .................... | H04M 67/12 |
| 2019/0041842 A1* | 2/2019 | Cella | .................. | G05B 23/0264 |
| 2019/0324444 A1* | 10/2019 | Cella | .................. | G05B 19/4183 |
| 2020/0120068 A1 | 4/2020 | Senftleber et al. | | |
| 2020/0225655 A1* | 7/2020 | Cella | ................ | G05B 19/41875 |

OTHER PUBLICATIONS

International Search Report for Application No. PCT/IB2021/050509, mailed on Apr. 16, 2021, 3 pages.

* cited by examiner

SYSTEMS AND METHODS FOR MULTIPLEXING AND DE-MULTIPLEXING DATA EVENTS OF A PUBLISHING PLATFORM

CROSS REFERENCE TO RELATED APPLICATIONS

This application is based upon and claims the right of priority under 35 U.S.C. § 371 to International Application No. PCT/IB2021/050509 filed on Jan. 22, 2021. International Application No. PCT/IB2021/050509 is hereby incorporated by reference herein in its entirety. International Application No. PCT/IB2021/050509 claims priority to Vietnamese Patent Application No. 1-2020-03990, filed on Jul. 9, 2020. Vietnamese Patent Application No. 1-2020-03990 is hereby incorporated by reference herein in its entirety.

BACKGROUND

Some analytics systems define identifiers that the analytics system can use to assign collected event data to a particular project. The analytics system, when configured with the identifiers, can collect signals from a publishing platform (e.g., a mobile application, a website, etc.) and assign the collected data to the appropriate property (e.g., an endpoint) based on the identifiers, e.g., assign collected data of a mobile application to a property associated with the mobile application, assign collected data of a website to a property associated with the website, etc. The analytics system can perform analysis and/or integration of the collected data with content provider systems.

However, some publishing platforms may provide content of multiple different content providers. For example, a video game platform could provide various video games developed by different video game companies. A news platform could provide news content of different news media sources. When an analytics system uses identifiers for publishing platforms that provide content of multiple different content providers, the identifiers cause all collected data of the publishing platform to be assigned to the property associated with the publishing platform, not the content provider. In this regard, all data ownership is granted to the publishing platform and not the content provider.

For a publishing platform that publishes content of different content providers, there may be issues with assigning all of the content provider data to a single identifier for the publishing platform at the analytics system. One issue may be that signals collected for the publishing platform might be business sensitive for different content providers. Furthermore, data will have to be re-assigned to the appropriate publisher on the servers of the analytics system, thus increasing the risk of data leaks between content providers. In many cases, the publishing data should not be shared across content providers. Furthermore, there may be inaccuracies in the collected data, for example, user engagement time may be measured on a global platform usage basis instead of being content specific.

SUMMARY

In general, one innovative aspect of the subject matter described in this specification can be implemented in methods that include a method including receiving, by one or more processing circuits of a publishing platform, one or more first data events associated with first content of a first content provider and one or more second data events associated with second content of a second content provider, wherein the publishing platform publishes content of the first content provider and the second content provider. The method includes generating, by the one or more processing circuits of the publishing platform, multiplexed data by multiplexing the one or more first data events and the one or more second data events. The method further includes communicating, by the one or more processing circuits of the publishing platform, the multiplexed data to a de-multiplexer of an analytics system, wherein the de-multiplexer de-multiplexes the multiplexed data into the one or more first data events and the one or more second data events, communicates the one or more first data events to a first endpoint associated with the first content provider, and communicates the one or more second data events to a second endpoint associated with the second content provider.

In general, one example innovative aspect of the subject matter described in this specification can be implemented in publishing platform systems that include a publishing platform system including one or more memory devices configured to store instructions thereon, that, when executed by one or more processors, cause the one or more processors to receive one or more first data events associated with first content of a first content provider and one or more second data events associated with second content of a second content provider, wherein the publishing platform publishes content of the first content provider and the second content provider, generate multiplexed data by multiplexing the one or more first data events and the one or more second data events, and communicate the multiplexed data to a de-multiplexer of an analytics system, wherein the de-multiplexer de-multiplexes the multiplexed data into the one or more first data events and the one or more second data events, communicates the one or more first data events to a first endpoint associated with the first content provider, and communicates the one or more second data events to a second endpoint associated with the second content provider.

In general, one example innovative aspect of the subject matter described in this specification can be implemented in analytics systems that include an analytics system including one or more memory devices configured to store instructions thereon, that, when executed by one or more processors, cause the one or more processors to receive multiplexed data, wherein the multiplexed data is multiplexed by one or more processing circuits of a publishing platform, wherein the one or more processing circuits of the publishing platform receive one or more first data events associated with first content of a first content provider and one or more second data events associated with second content of a second content provider, wherein the publishing platform publishes content of the first content provider and the second content provider and generate the multiplexed data by multiplexing the one or more first data events and the one or more second data events. The instructions cause the one or more processors to implement a de-multiplexer to de-multiplex the multiplexed data into the one or more first data events and the one or more second data events, communicate the one or more first data events to a first endpoint associated with the first content provider, and communicate the one or more second data events to a second endpoint associated with the second content provider.

In general, another example aspect of the subject matter described in this specification can be implemented in one or more computer readable storage media configured to store instructions thereon that, when executed by one or more processors, cause the one or more processors to receive multiplexed data, wherein the multiplexed data is multiplexed by one or more processing circuits of a publishing platform, wherein the one or more processing circuits of the publishing platform receive one or more first data events associated with first content of a first content provider and one or more second data events associated with second content of a second content provider, wherein the publishing platform publishes content of the first content provider and the second content provider and generate the multiplexed data by multiplexing the one or more first data events and the one or more second data events. The instructions cause the one or more processors to perform implement a de-multiplexer to de-multiplex the multiplexed data into the one or more first data events and the one or more second data events, communicate the one or more first data events to a first endpoint associated with the first content provider, and communicate the one or more second data events to a second endpoint associated with the second content provider.

In general, another example innovative aspect of the subject matter described in this specification is a method including receiving, by one or more processing circuits of an analytics system, multiplexed data, wherein the multiplexed data is multiplexed by one or more processing circuits of a publishing platform. The one or more processing circuits of the publishing platform receive one or more first data events associated with first content of a first content provider and one or more second data events associated with second content of a second content provider, wherein the publishing platform publishes content of the first content provider and the second content provider. The one or more processing circuits of the publishing generate the multiplexed data by multiplexing the one or more first data events and the one or more second data events. The method includes implementing, by the one or more processing circuits, a de-multiplexer to de-multiplex the multiplexed data into the one or more first data events and the one or more second data events, communicate the one or more first data events to a first endpoint associated with the first content provider, and communicate the one or more second data events to a second endpoint associated with the second content provider.

In general, another example aspect of the subject matter described in this specification can be implemented in one or more computer readable storage media configured to store instructions thereon that, when executed by one or more processors, cause the one or more processors to receive one or more first data events associated with first content of a first content provider and one or more second data events associated with second content of a second content provider, wherein the publishing platform publishes content of the first content provider and the second content provider. The instructions cause the one or more processors to generate multiplexed data by multiplexing the one or more first data events and the one or more second data events and communicate the multiplexed data to a de-multiplexer of an analytics system, wherein the de-multiplexer de-multiplexes the multiplexed data into the one or more first data events and the one or more second data events, communicates the one or more first data events to a first endpoint associated with the first content provider, and communicates the one or more second data events to a second endpoint associated with the second content provider.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Referring generally to the Figures, systems and methods in some embodiments are shown for an analytics system that manages data collection for a publishing platform that publishes content of different content providers. The analytics system may facilitate data multiplexing at the publishing platform to multiplex data of different content providers. When the data is received by the analytics system, the analytics system may de-multiplex the collected data and forward the de-multiplexed data to particular properties associated with the different content providers or different content items, e.g., endpoints for aggregation and/or processing of the data.

Multiplexing collected analytics data can ensure a seamless integration of data collection via the published content and can provide many advantages. For example, the publishing platform can utilize a native interface to the analytics system. Furthermore, a lower overall data network usage can be realized through the data multiplexing since data of each published content item is aggregated on the client side (e.g., at a website or application) and transmitted to the analytics platform as a package of data. Furthermore, platform metric sharing that facilitates attribution of some of the platform metrics to each content provider can allow transparency in the hosting performance. Furthermore, some metrics can be captured automatically for content providers via the endpoints where data is aggregated for each content provider.

In some embodiments, a system can multiplex data of content providers (e.g., a first publisher and a second publisher) at a publishing platform and de-multiplex the multiplexed data at an analytics server for forwarding to endpoints associated with the content providers (e.g., an analytics property for the first publisher and an analytics property for the second publisher) and an analytics property of the publishing platform (i.e., analytics property for the platform).

Content providers, e.g., the first publisher and/or the second publisher, can send analytic events to the publishing platform. In some embodiments, the content providers utilize application programming interfaces (APIs) provided by the publishing platform and/or provided by the analytics system for generating the events and sending the events to the publishing platform. In some embodiments, an analytics component of the publishing platform multiplexes all of the events collected. The result of the multiplexed data may be a data package including events for all content and/or content providers.

In some embodiments, the multiplexed analytics data is uploaded to a de-multiplexer of the analytics system. The analytics data can be transmitted over a network, e.g., from one or more server systems associated with the publishing platform to one or more server systems associated with the analytics platform. In some embodiments, the de-multiplexer splits the multiplexed data back into publisher and/or content specific data. In some embodiments, the de-multiplexed data can be forwarded to the appropriate analytics endpoints for various content providers, content items, and/or the publishing platform.

In some embodiments, the de-multiplexed data of the content providers can be forwarded to the endpoints associated with the various content providers, e.g., the analytics property for the first publisher and the analytics property for the second publisher. In some embodiments, the de-multiplexer is configured with one or more rules for forwarding the data. In some embodiments, the platform data for the publishing platform that is de-multiplexed by the de-multiplexer can be uploaded to the platform specific analytics endpoint, i.e., the analytics property for the publishing platform.

In some embodiments, the multiplexing and de-multiplexing can be used with publishing news platforms that publish news of multiple media sources or video game platforms that provide video games to users where the video games are developed by various video game studios. For example, the publishing platform could be augmented with an API that content providers can use to publish events from content of the content providers (e.g., via video games of a video game studio, news stories of a news outlet, applications of a software developer, etc.). The events can be automatically routed through to endpoints of an analytics system associated with the particular content providers. In this regard, the content providers can view dashboards that include the collected content data and/or metrics generated based on the collected data. In this regard, dashboards can be generated by the analytics system for each endpoint to which data is forwarded.

Figure 1:
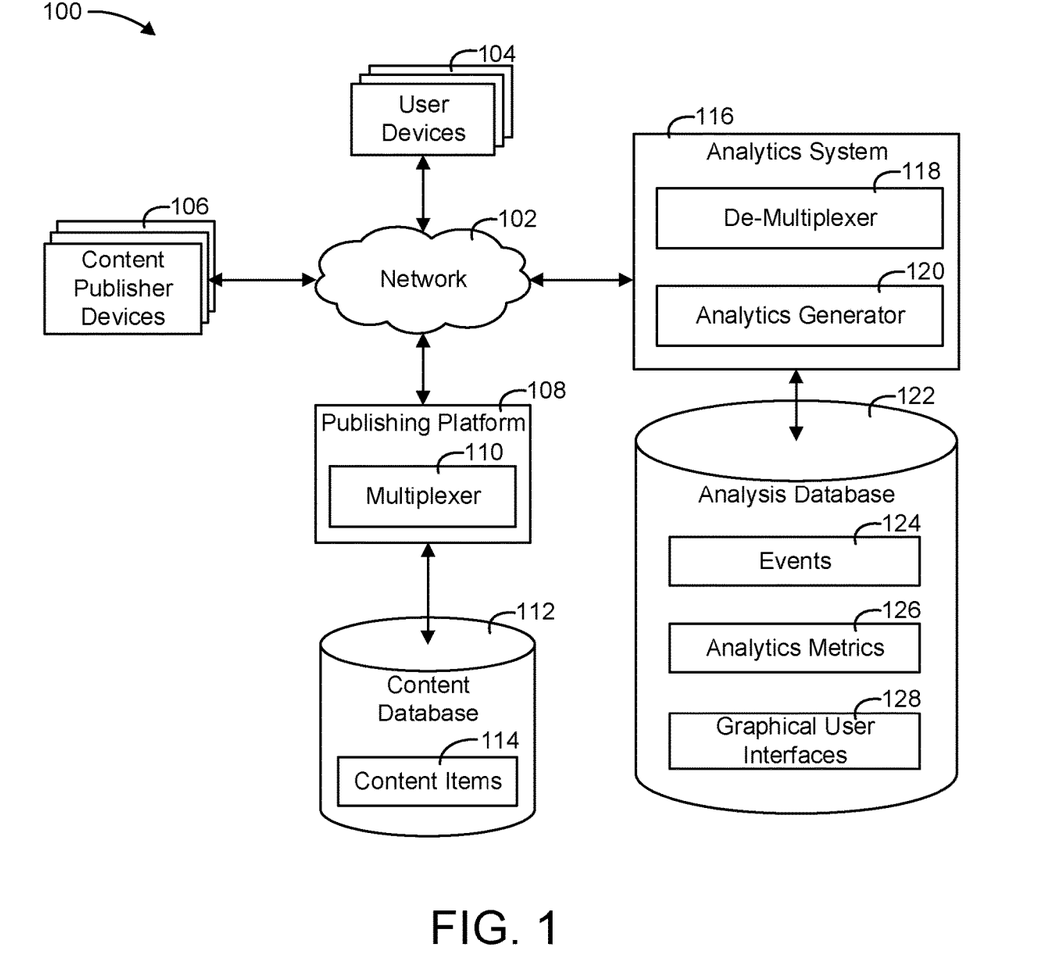
FIG. 1 is a block diagram of a system including a publishing platform and an analytics system according to an illustrative implementation.

Referring now to FIG. 1, a block diagram of a system 100 is shown according to an illustrative implementation. One or more user devices 104 may be used by a user to perform various actions and/or access various types of content, some of which may be provided over a network 102 (e.g., the Internet, LAN, WAN, etc.). A "user" or "entity" used herein may refer to an individual operating user devices 104, interacting with resources or content items via the user devices 104, etc. The user devices 104 may be used to access websites (e.g., using an interne browser), media files, and/or any other types of content.

A publishing platform 108 may be configured to provide content to users within resources (e.g., webpages, applications, etc.) and to provide content items to the user devices 104 over the network 102 to be included within the resources. The content from which the publishing platform 108 selects items may be provided by one or more content providers via the network 102 using one or more content publisher devices 106. The publishing platform 108 can include one or more processors (e.g., any general purpose or special purpose processor), and can include and/or be operably coupled to one or more transitory and/or non-transitory storage mediums and/or memory devices (e.g., any computer-readable storage media, such as a magnetic storage, optical storage, flash storage, RAM, etc.).

The content that the publishing platform 108 publishes can be content items 114 stored in a content database 112. The publishing platform 108 may receive the content items 114 from the content publisher devices 106 via the network 102 and store the content items 114 for delivery to the user devices 104 via a resource. In some embodiments, rather than storing the content items 114 in the content database 112, the content can be hosted by systems of the content publishers and provided by the publishing platform 108 via a resource to the user devices 104. In some embodiments, the content database 112 is one or more transitory and/or non-transitory storage mediums and/or memory devices (e.g., any computer-readable storage media, such as a magnetic storage, optical storage, flash storage, RAM, etc.). In some embodiments, the content items 114 are video games, movies, television shows, news articles, news videos, mobile applications, computer applications, and/or any other type of content.

The publishing platform 108 may be a platform that delivers the content items 114 of multiple content publishers. The publishing platform 108 could be a video game platform that publishes multiple video games of multiple video game studios that a user can interact with (e.g., play) and/or download to the user devices 104. The publishing platform 108 could be a news platform where news articles and/or news videos of multiple news organizations are aggregated and displayed to users via the user devices 104. Furthermore, the publishing platform 108 could be a video streaming platform where videos, movies, and/or shows (created by various studios) are streamed to the user devices 104.

In some implementations, the publishing platform 108 may select content items from content providers to be displayed on the user devices 104. In such implementations, the publishing platform 108 may determine content to be published in one or more content interfaces of resources (e.g., webpages, applications, etc.). In some embodiments, the publishing platform 108 can facilitate the download and/or streaming of content to the user devices 104 via the network 102.

The publishing platform 108 can receive events. The events may be associated with interactions made by the users of the user devices 104 with the content items 114 published by the publishing platform 108. For example, the events could indicate a user selecting the content, viewing the content for a particular time, playing a video game for a particular amount of time, watching a news video, etc. The events can be indicative of the performance of individual pieces of content, e.g., how much play time certain video games receive and/or the publishing platform 108 itself, e.g., how much time a certain user spends interacting with content of the publishing platform 108.

The publishing platform 108 includes a multiplexer 110. The multiplexer 110 can be configured to multiplex the events of the publishing platform 108 together. The multiplexed events can be a data group, e.g., a data package. Each event may be associated with a particular identifier. The identifier can identify a content publisher that published the content that the particular event is associated with and/or can identify the content itself. The publishing platform 108 can communicate the multiplexed data to the analytics system 116. The publishing platform 108 can communicate the multiplexed data to the analytics system 116 via the network 102. Instead of communicating the events individually and/or in multiple data streams based on the content provider associated with the events, the publishing platform 108 can communicate multiplexed data to the analytics system 116 in a single data stream. This can conserve bandwidth and data network usage.

The analysis system 116 can include one or more processors (e.g., any general purpose or special purpose processor), and can include and/or be operably coupled to one or more transitory and/or non-transitory storage mediums and/or memory devices (e.g., any computer-readable storage media, such as a magnetic storage, optical storage, flash storage, RAM, etc.). The analytics system 116 can be communicably and operatively coupled to the analysis database 122. The analytics system 116 can be configured to query the analysis database 122 for information and store information in the analysis database 122. In various implementations, the analysis database 122 includes various transitory and/or non-transitory storage mediums. The storage mediums may include but are not limited to magnetic storage, optical storage, flash storage, RAM, etc. The analysis database 122 and/or the analytics system 116 can use various APIs to perform database functions (i.e., managing data stored in the database 122). The APIs can be but are not limited to SQL, ODBC, JDBC, etc.

Analytics system 116 can be configured to communicate with any device or system shown in system 100 via network 102. The analytics system 116 can be configured to receive the multiplexed data from the publishing platform 108. The analytics system 116 can de-multiplex the multiplexed data into data of individual content publishers and/or for individual pieces of content. The analytics system 116 can be configured to generate analytics metrics for display to the various content publishers based on the de-multiplexed events associated with each content publisher. The analytics could indicate total play time associated with a video game, e.g., how many hours users, or a particular user, have played a particular video game. The metrics can further indicate watch times associated with videos, movies, or shows associated with groups of users and/or particular users. The metrics can further indicate how many news articles have been selected for reading by users and/or groups of users.

The analytics system 116 may include one or more modules (i.e., computer-readable instructions executable by a processor) and/or circuits (i.e., ASICs, Processor Memory combinations, logic circuits, etc.) configured to perform various functions of the analytics system 116. The analytics system 116 includes a de-multiplexer 118 and an analytics generator 120. The de-multiplexer 118 can be configured to de-multiplex the multiplexed events received from the multiplexer 110. The de-multiplexer 118 can de-multiplex the multiplexed events and store the events as events 124 in the analysis database 122. In some embodiments, the multiplexed events are de-multiplexed based on an identifier associated with each event. In some embodiments, the de-multiplexed events are forwarded to particular properties, e.g., endpoints associated with a particular entity, e.g., a content publisher, a particular content item, etc.

The analytics generator 120 can generate analytics metrics 126 based on the events 124. In some embodiments, the analytics generator 120 generates the analytics metrics 126 for a particular endpoint based on events associated with the endpoint. In this regard, the analytics metrics 126 can be specific to the endpoint, e.g., to a content publisher, instead of the publishing platform 108. The analytics metrics 126 can indicate play times for a video game, watch time for a movie or television show, a number of users that read a news article, and/or any other type of metric. The metrics can further indicate conversions, e.g., purchases of a video game, purchases of a movie or television show, etc.

The analytics generator 120 can be configured to generate graphical user interfaces 128. The graphical user interfaces 128 can be displayed on display of the content publisher devices 106. The graphical user interfaces 128 can be generated for specific endpoints based on the events and/or analytics metrics associated with the specific endpoint. The graphical user interfaces 128 can include graphical elements that display the events 124, the analytics metrics 126, trends, charts, and/or graphs of the analytics metrics 126, and/or any other element of a graphical user interface.

Figure 2:
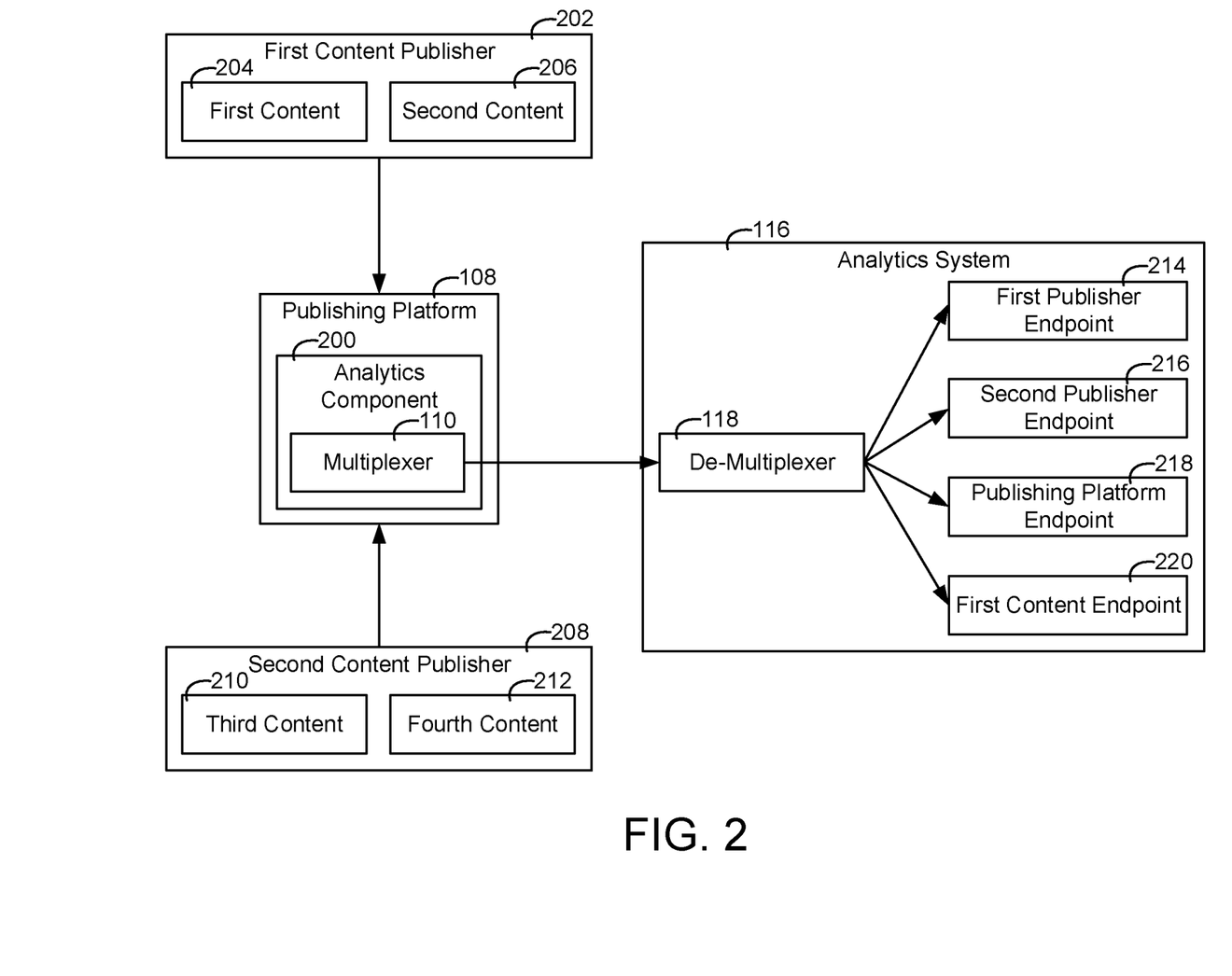
FIG. 2 is a block diagram of a multiplexer of the publishing platform multiplexing events of content of multiple content publishers and a de-multiplexer of an analytics system that de-multiplexes the events according to an illustrative implementation.

Referring now to FIG. 2, the multiplexer 110 of the publishing platform 108 multiplexing events of content of multiple content publishers and the de-multiplexer 118 of the analytics system 116 that de-multiplexes the events is shown according to an illustrative implementation. A first content publisher 202 and a second content publisher 208 may be exemplary content publishers of the content publishers associated with the content publisher devices 106 and described with reference to FIG. 1. Although FIG. 2 provides two exemplary content publishers 202 and 208, the system of FIG. 2, and all of the systems described herein, can be scalable to any number of content publishers. The multiplexer 110 can multiplex data events of all of the content publishers or a subset of the content publishers based on the interactions of one or more users with the content.

The first content publisher 202 publishes two exemplary pieces of content, first content 204 and second content 206. The first content publisher 202 can be configured to publish any number of different pieces of content. The second content publisher 208 publishes two exemplary pieces of content, third content 210 and fourth content 212. The second content publisher 208 can be configured to publish any number of different pieces of content. The content 204-212 can be the same as or similar to the content items 114 as described with reference to FIG. 1. The content 204-212 could be a video game, a movie, a show, a news article, a written publication and/or any other type of content.

The publishing platform 108 can receive the content 204-212 from the first content publisher 202 and the second content publisher 208 and allow for users to interact with the content 204-212 via the user devices 104. Interacting with the content can cause events to be generated. The events can indicate a user watching a video and/or watching a video for a particular amount of time. The events can indicate a user playing a video game and/or playing the video game for a predefined amount of time.

An analytics component 200 of the publishing platform 108 can collect the events and multiplex the events together before providing the multiplexed events to the analytics system 116. The de-multiplexer 118 can de-multiplex the events received from the publishing platform 108 and communicate (e.g., forward) the de-multiplexed events to the particular endpoints that the events are associated with. The endpoints can include a first publisher endpoint 214, a second publisher endpoint 216, a publishing platform endpoint 218, and a first content endpoint 220.

Each of the endpoints 214-220 can be associated with a particular entity for which analytics and/or dashboards are generated. The endpoints can represent logical ends of a communication channel. The endpoints can be endpoints of an API. In some embodiments, the endpoints may include independent storage resources for storing events and/or may indicate storage locations of shared storage resources.

An endpoint could be an endpoint specific to a content publisher so that a content publisher can view how well their content is performing, e.g., the first publisher endpoint 214 and the second publisher endpoint 216. In this regard, analytics metrics 126 and/or graphical user interfaces 128 can be generated to indicate the performance of the first content publisher 202 based on events forwarded to the first publisher endpoint 214. Analytics metrics 126 and/or graphical user interfaces 128 can be generated by the analytics system 116 for the second content publisher 208 based on events forwarded to the second publisher endpoint 216.

Furthermore, the endpoint could be an endpoint of the publishing platform 108. In this regard, analytics and/or graphic interfaces can be generated that indicate the performance of the publishing platform 108 based on events forwarded to the endpoint of the publishing platform 108, i.e., the publishing platform endpoint 218. In some embodiments, analytics metrics 126 and/or graphical user interfaces 128 can be generated for a specific content item, e.g., the analytics system 116 can be configured to generate analytics and/or user interfaces based on events forwarded to the first content endpoint 220.

Figure 3:
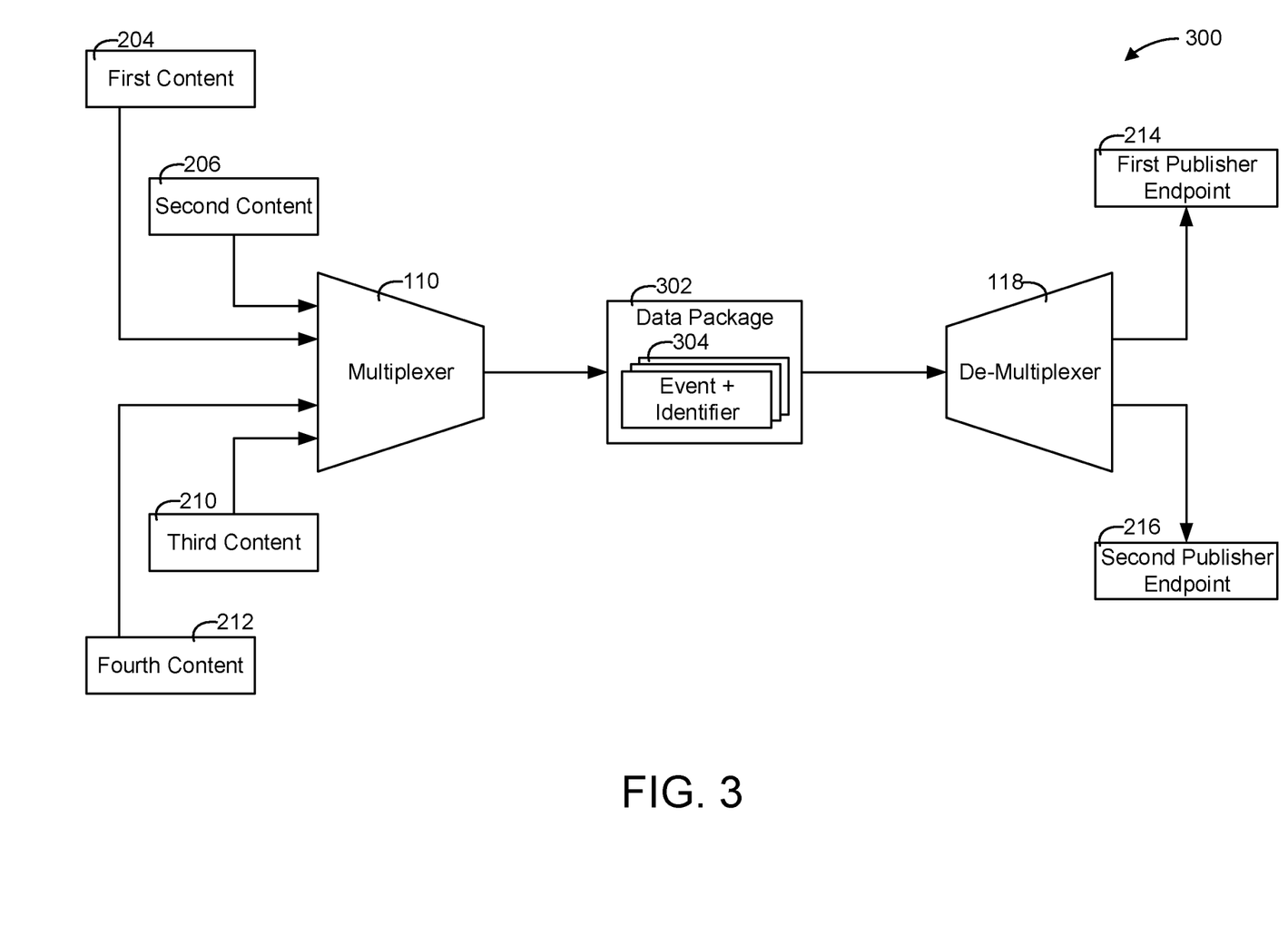
FIG. 3 is a block diagram of the multiplexer multiplexing events of content of multiple content publishers and the de-multiplexer of an analytics system de-multiplexing the events based on an identifier and communicating the events to endpoints according to an illustrative implementation.

Referring now to FIG. 3, the multiplexer 110 multiplexing events of content of multiple content publishers and the de-multiplexer 118 of the analytics system 116 de-multiplexing the events based on an identifier and communicating the events to endpoints is shown according to an illustrative implementation. The multiplexer 110 can be configured to receive events for the first content 204, the second content 206, the third content 210, and/or the fourth content 212. The multiplexer 110 can be configured to multiplex the events together into a data package 302. In some embodiments, the multiplexer 110 multiplexes the events together based on a time window. For example, all events received within a particular interval of time could be multiplexed together by the multiplexer 110 into the data package 302.

The data package 302 can be a group of multiple events and identifiers 304. Each event can originate from one of the first content 204, the second content 206, the third content 210, and/or the fourth content 212. The identifier of each event can indicate one of the particular content items and/or a publisher associated with the content items, e.g., the first content publisher 202 and the second content publisher 208. The identifier could be numerical values, alphanumeric values, human recognizable words and/or phrases, etc.

The de-multiplexer 118 can de-multiplex the events of the data package 302 into individual events that the de-multiplexer 118 can forward to the events to endpoints, e.g., the first publisher endpoint 214 and the second publisher endpoint 216. For example, in some embodiments, the de-multiplexer 118 can analyze the identifier of each event and route the events to the endpoints based on the identifier. For example, the events associated with the first content 204 and the second content 206 could have an identifier that identifies the first content publisher 202. In this regard, the de-multiplexer 118 can de-multiplex the events associated with the first content 204 and the second content 206 and forward the events to the first publisher endpoint 214 associated with the first content publisher 202.

Similarly, the de-multiplexer 118 can forward events of the third content 210 and the fourth content 212 to the second publisher endpoint 216 based on an identifier associated with the second content publisher 208. In some embodiments, an identifier can be associated with a particular piece of content. For example, an identifier may uniquely identify the first content 204. In this regard, the de-multiplexer 118 can forward events of the first content 204 to an endpoint associated with the first content 204 in response to detecting the identifier of the first content 204. Similarly, events associated with the publishing platform 108 could be forwarded by the de-multiplexer 118 to an endpoint associated with the publishing platform based on an identifier uniquely identifying the publishing platform.

Figure 4A:
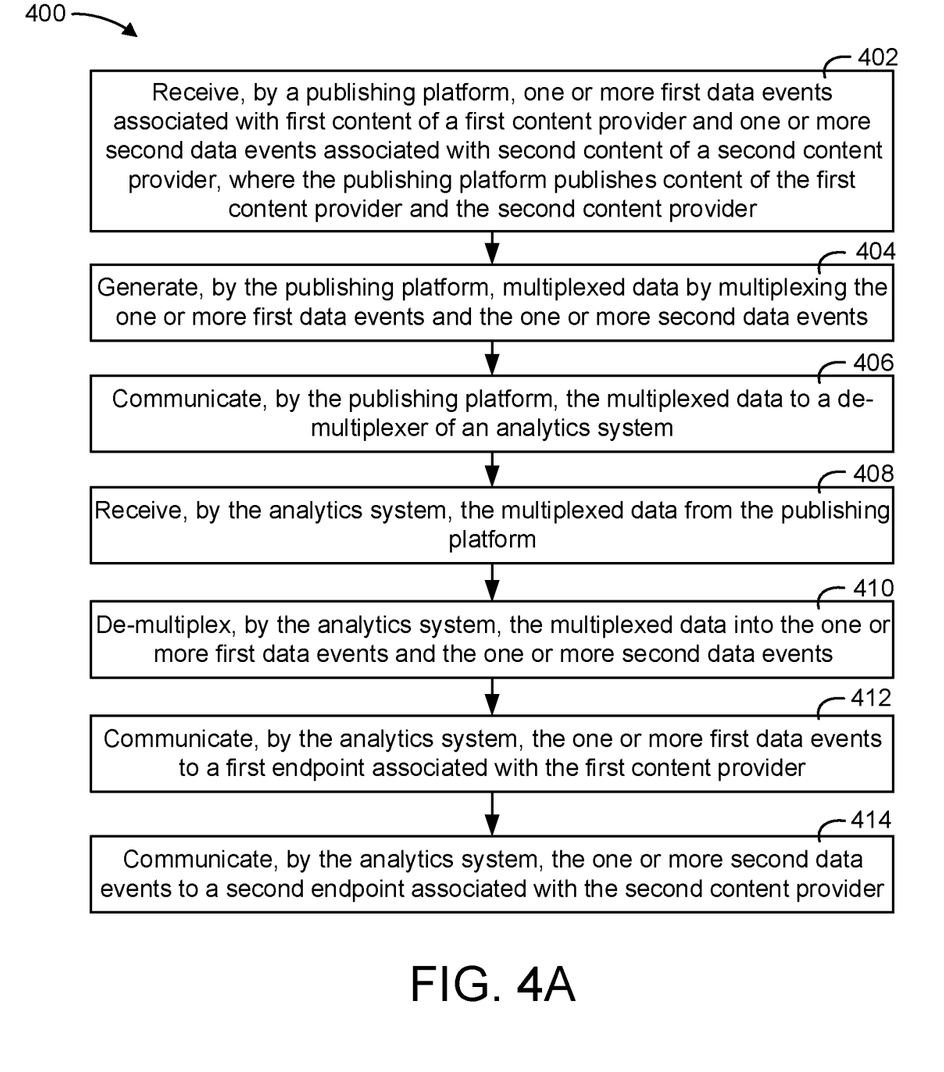
FIG. 4A is a flow diagram of a process of multiplexing events of content of multiple content publishers by the publishing platform and de-multiplexing the events by the analytics system according to an illustrative implementation.

Referring now to FIG. 4A, a flow diagram of a process 400 of multiplexing events of content of multiple content publishers by the publishing platform and de-multiplexing the events by the analytics system according to an illustrative implementation. In some embodiments, the analytics system 116 and/or the publishing platform 108 can be configured to perform the process 400. The process 400 can be performed by one or more groups of servers, processing circuits, and/or any other type of computing device. For example, one or more first servers and/or processing circuits associated with the publishing platform 108 could perform the steps 402-406 while one or more second servers and/or processing circuits associated with the analytics system 116 could perform the steps 408-414.

In step 402, the publishing platform 108 can receive one or more first data events associated with first content of a first content provider and one or more second data events associated with second content of a second content provider, where the publishing platform publishes content of the first content provider and the second content provider. The publishing platform 108 can host or otherwise deliver content hosted by content publishers to an end user, e.g., to users via the user devices 104. The content could be movies, video games, news articles, etc., e.g., the first content 204, the second content 206, the third content 210, and the fourth content 212. The events can be interactions with the content, indications of watch time, play time, etc.

In step 404, the publishing platform 108 generates multiplexed data by multiplexing the one or more first data events and the one or more second data events. In some embodiments, the multiplexer 110 of the publishing platform 108 can multiplex the first and second data events together. The result may be the data package 302. In step 406, the publishing platform 108 can communicate the multiplexed data to the de-multiplexer 118 of the analytics system 116. In step 408, the analytics system 116 can receive the multiplexed data from the publishing platform 108. In some embodiments, the analytics system 116 routes the multiplexed data to the de-multiplexer 118 of the analytics system 116 for de-multiplexing the multiplexed data into the individual first and second events.

In step 410, the analytics system 116 de-multiplexes the multiplexed data into the one or more first data events and the one or more second data events. The analytics system 116 includes a de-multiplexer 118 that de-multiplexes the multiplexed data. The de-multiplexer 118 can operate to de-multiplex the multiplexed data based on one or more rules. For example, the rules may indicate that events associated with particular identifiers are separated and forwarded to specific endpoints. The de-multiplexer 118 could de-multiplex the multiplexed data based on content names includes within the multiplexed data and one or more rules that associate certain content names with certain endpoints.

In step 412, the analytics system 116 can communicate the one or more first events to a first endpoint associated with the first content provider. The analytic system 116 may route the one or more first events to the first endpoint based on a first identifier associated with the first content provider that is included with the one or more first events in the multiplexed data. In step 414, the analytics system 116 can communicate the one or more second events to a second endpoint associated with the second content provider. The analytic system 116 may route the one or more second events to the second endpoint based on a second identifier associated with the second content provider that is included with the one or more second events in the multiplexed data.

Figure 4B:
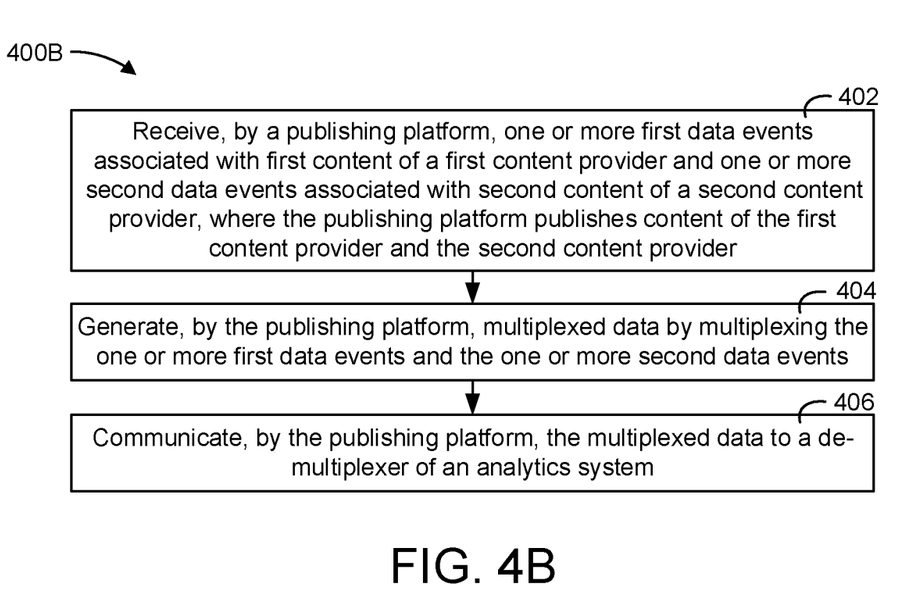
FIG. 4B is a flow diagram of a process of multiplexing the events of the content of the multiple content publishers by the publishing platform according to an exemplary implementation.

Referring now to FIG. 4B, process 400B of multiplexing the events of the content of the multiple content publishers by the publishing platform 108 is shown according to an exemplary implementation. The process 400B includes the steps 402-406 which are described in greater detail with reference to FIG. 4. The publishing platform 108, or any other system as described herein, can be configured to perform the steps 402-406.

In step, 402, the publishing platform 108 can receive one or more first events associated with first content of a first content provider and one or more second events associated with second content of a second content provider. The publishing platform 108 can publish content of the first content provider and the second content provider and users can interact with the first content and the second content, causing the one or more first events and the one or more second events to be generated. In step 404, the publishing platform 108 can generate multiplexed data by multiplexing the one or more first data events and the one or more second data events. In step 406, the publishing platform 108 can communicate the multiplexed data to the de-multiplexer 118 of the analytics system 116.

Figure 4C:
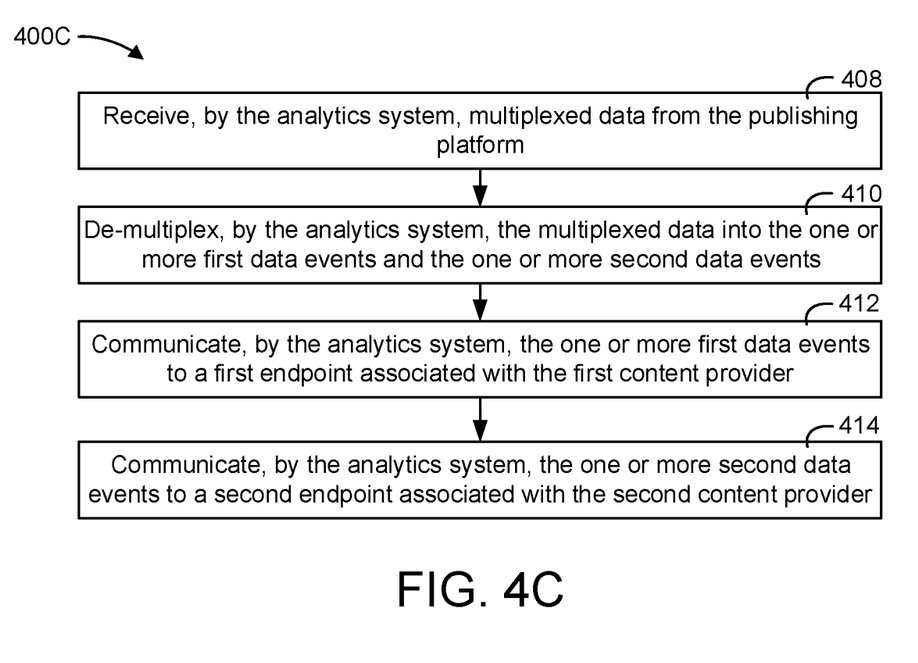
FIG. 4C is a flow diagram of a process of de-multiplexing the events by the analytics system according to an illustrative implementation.

Referring now to FIG. 4C, a process 400C of de-multiplexing the events by the analytics system according to an illustrative implementation. The process 400C includes the steps 408-414 which are described in greater detail with reference to FIG. 4. The analytics system 116, or any other system as described herein, can be configured to perform the steps 408-414.

In step 408, the analytics system 116 can receive multiplexed data from the publishing platform 108. The multiplexed data can be the data generated in the step 406 of FIG. 4B. In step 410, the analytics system 116 can de-multiplex the multiplex data into the one or more first data events and the one or more second data events. In step 412, the analytics system 116 can communicate the one or more first data events to a first endpoint associated with the first content provider. In step 414, the analytics system 116 can communicate the one or roe second events to a second endpoint associate with the second content provider.

Figure 5:
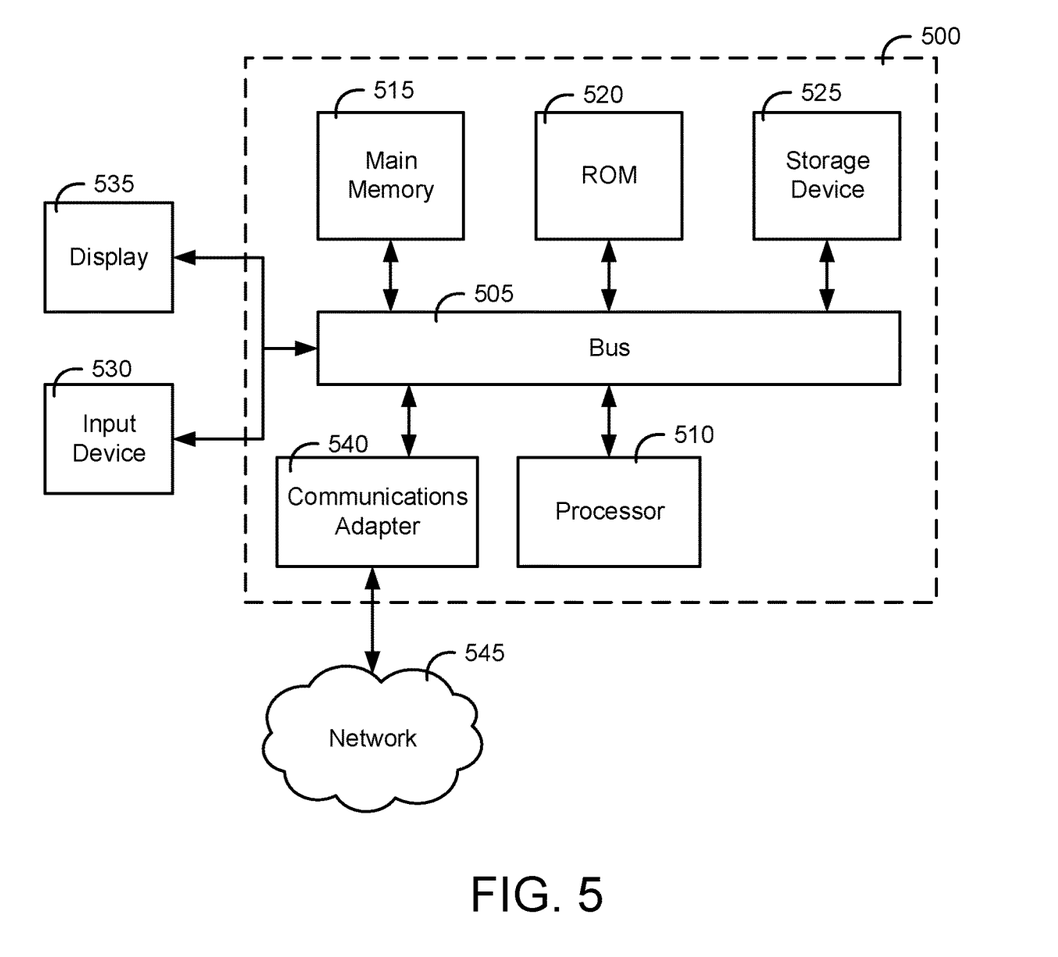
FIG. 5 is a block diagram of a computing system according to an illustrative implementation.

Referring now to FIG. 5, a computer system 500 is shown that can be used, for example, to implement an illustrative user device 104, an illustrative publishing platform 108, an illustrative content provider device 106, an illustrative analytics system 116, and/or various other illustrative systems described in the present disclosure. The computing system 500 includes a bus 505 or other communication component for communicating information and a processor 510 coupled to the bus 505 for processing information. The computing system 500 also includes main memory 515, such as a random access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information, and command selections to the processor 510. In another implementation, the input device 530 has a touch screen display 535. The input device 530 can include a cursor control, such as a mouse, a trackball, or cursor direction keys, for communicating direction information and command selections to the processor 510 and for controlling cursor movement on the display 535.

In some implementations, the computing system 500 may include a communications adapter 540, such as a networking adapter. Communications adapter 540 may be coupled to bus 505 and may be configured to enable communications with a computing or communications network 545 and/or other computing systems. In various illustrative implementations, any type of networking configuration may be achieved using communications adapter 540, such as wired (e.g., via Ethernet), wireless (e.g., via Wi-Fi, Bluetooth, etc.), pre-configured, ad-hoc, LAN, WAN, etc.

According to various implementations, the processes that effectuate illustrative implementations that are described herein can be achieved by the computing system 700 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to implement illustrative implementations. Thus, implementations are not limited to any specific combination of hardware circuitry and software.

Although an example processing system has been described in FIG. 5, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate interne connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TELEVISION channel, on a satellite TELEVISION channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, by one or more processing circuits of a publishing platform, one or more first data events associated with first content of a first content provider and one or more second data events associated with second content of a second content provider, wherein the publishing platform publishes content of the first content provider and the second content provider;
   generating, by the one or more processing circuits of the publishing platform, multiplexed data by multiplexing the one or more first data events and the one or more second data events; and
   communicating, by the one or more processing circuits of the publishing platform, the multiplexed data to a de-multiplexer of an analytics system, wherein the de-multiplexer de-multiplexes the multiplexed data into the one or more first data events and the one or more second data events, communicates the one or more first data events to a first endpoint associated with the first content provider, and communicates the one or more second data events to a second endpoint associated with the second content provider.

2. The method of claim 1, wherein the publisher platform causes a plurality of user devices to provide the first content and the second content to a user;
   wherein the one or more first data events and the one or more second data events are generated by the plurality of user devices based on interactions with the first content and the second content via the plurality of user devices.

3. The method of claim 1, wherein generating, by the one or more processing circuits of the publishing platform, the multiplexed data comprises multiplexing the one or more first data events, the one or more second data events, and one or more third data events, the one or more third data events associated with a third content item;
   wherein the de-multiplexer de-multiplexes the multiplexed data into the one or more first data events, the one or more second data events, and the one or more third data events, wherein the de-multiplexer communicates the one or more third data events to an endpoint associated with the third content.

4. The method of claim 1, wherein the one or more first data events each include a first identifier associated with the first content provider and the one or more second data events each include a second identifier associated with the second content provider;

wherein the de-multiplexer de-multiplexes the multiplexed data based on the first identifier and the second identifier, communicates the one or more first data events to the first endpoint based on the first identifier, and communicates the one or more second data events to the second endpoint based on the second identifier.

5. The method of claim 1, wherein the method further comprises:
receiving, by one or more processing circuits of the analytics system, the multiplexed data;
implementing, by the one or more processing circuits of the analytics system, the de-multiplexer to:
de-multiplex the multiplexed data into the one or more first data events and the one or more second data events;
communicate the one or more first data events to a first endpoint associated with the first content provider; and
communicate the one or more second data events to a second endpoint associated with the second content provider.

6. The method of claim 1, further comprising receiving, by the one or more processing circuits of the publishing platform, one or more publisher data events associated with the publishing platform;
wherein generating, by the one or more processing circuits of the publishing platform, the multiplexed data comprises multiplexing the one or more first data events, the one or more second data events, and the one or more publisher data events;
wherein the de-multiplexer of the analytics system de-multiplexes the multiplexed data into the one or more first data events, the one or more second data events, and the one or more publisher data events, wherein the de-multiplexer communicates the one or more publisher data events to a publisher endpoint associated with the publisher platform.

7. The method of claim 6, wherein the method further comprises:
generating, by one or more processing circuits, of the analytics system, one or more publisher metrics for the publisher platform based on the one or more publisher data events communicated to the publisher endpoint;
generating, by the one or more processing circuits of the analytics system, a publisher dashboard including at least one of the one or more publisher data events or the one or more publisher metrics; and
causing, by the one or more processing circuits of the analytics system, a user interface of a publisher user device to display the publisher dashboard, wherein the publisher user device is associated with the publisher platform.

8. The method of claim 1, wherein the method further comprises:
generating, by one or more processing circuits, of the analytics system, one or more first metrics for the first content provider based on the one or more first data events communicated to the first endpoint;
generating, by the one or more processing circuits of the analytics system, one or more second metrics for the second content provider based on the one or more second data events communicated to the second endpoint;
generating, by the one or more processing circuits of the analytics system, a first dashboard including at least one of the one or more first data events or the one or more first metrics; and generating, by the one or more processing circuits of the analytics system, a second dashboard including at least one of the one or more second data events or the one or more second metrics.

9. The method of claim 8, further comprising:
causing, by the one or more processing circuits of the analytics system, a user interface of a first user device to display the first dashboard, wherein the first user device is associated with the first content provider; and
causing, by the one or more processing circuits of the analytics system, a user interface of a second user device to display the second dashboard, wherein the second user device is associated with the second content provider.

10. A method comprising:
receiving, by one or more processing circuits of an analytics system, multiplexed data, wherein the multiplexed data is multiplexed by one or more processing circuits of a publishing platform, wherein the one or more processing circuits of the publishing platform:
receive one or more first data events associated with first content of a first content provider and one or more second data events associated with second content of a second content provider, wherein the publishing platform publishes content of the first content provider and the second content provider; and
generate the multiplexed data by multiplexing the one or more first data events and the one or more second data events; and
implementing, by the one or more processing circuits, a de-multiplexer to:
de-multiplex the multiplexed data into the one or more first data events and the one or more second data events;
communicate the one or more first data events to a first endpoint associated with the first content provider; and
communicate the one or more second data events to a second endpoint associated with the second content provider.

11. The method of claim 10, further comprising:
receiving, by one or more processing circuits of a publishing platform, the one or more first data events associated with first content of the first content provider and the one or more second data events associated with the second content of the second content provider, wherein the publishing platform publishes the content of the first content provider and the second content provider;
generating, by the one or more processing circuits of the publishing platform, the multiplexed data by multiplexing the one or more first data events and the one or more second data events; and
communicating, by the one or more processing circuits of the publishing platform, the multiplexed data to the de-multiplexer of the analytics system.

12. The method of claim 11, further comprising causing, by the one or more processing circuits of the publishing platform, a plurality of user devices to provide the first content and the second content to a user;
wherein the one or more first data events and the one or more second data events are generated by the plurality of user devices based on interactions with the first content and the second content via the plurality of user devices.

13. The method of claim 11, wherein generating, by the one or more processing circuits of the publishing platform, the multiplexed data comprises multiplexing the one or more first data events, the one or more second data events, and one or more third data events, the one or more third data events associated with a third content item;
    wherein the de-multiplexer de-multiplexes the multiplexed data into the one or more first data events, the one or more second data events, and the one or more third data events, wherein the de-multiplexer communicates the one or more third data events to an endpoint associated with the third content.

14. The method of claim 11, wherein the one or more first data events each include a first identifier associated with the first content provider and the one or more second data events each include a second identifier associated with the second content provider;
    wherein the de-multiplexer de-multiplexes the multiplexed data based on the first identifier and the second identifier, communicates the one or more first data events to the first endpoint based on the first identifier, and communicates the one or more second data events to the second endpoint based on the second identifier.

15. The method of claim 11, further comprising receiving, by the one or more processing circuits of the publishing platform, one or more publisher data events associated with the publishing platform;
    wherein generating, by the one or more processing circuits of the publishing platform, the multiplexed data comprises multiplexing the one or more first data events, the one or more second data events, and the one or more publisher data events;
    wherein the de-multiplexer of the analytics system de-multiplexes the multiplexed data into the one or more first data events, the one or more second data events, and the one or more publisher data events, wherein the de-multiplexer communicates the one or more publisher data events to a publisher endpoint associated with the publisher platform.

16. The method of claim 11, wherein the method further comprises:
    generating, by one or more processing circuits, of the analytics system, one or more publisher metrics for the publisher platform based on the one or more publisher data events communicated to the publisher endpoint;
    generating, by the one or more processing circuits of the analytics system, a publisher dashboard including at least one of the one or more publisher data events or the one or more publisher metrics; and
    causing, by the one or more processing circuits of the analytics system, a user interface of a publisher user device to display the publisher dashboard, wherein the publisher user device is associated with the publisher platform.

17. The method of claim 10, wherein the method further comprises:
    generating, by one or more processing circuits of the analytics system, one or more first metrics for the first content provider based on the one or more first data events communicated to the first endpoint;
    generating, by the one or more processing circuits of the analytics system, one or more second metrics for the second content provider based on the one or more second data events communicated to the second endpoint;
    generating, by the one or more processing circuits of the analytics system, a first dashboard including at least one of the one or more first data events or the one or more first metrics; and
    generating, by the one or more processing circuits of the analytics system, a second dashboard including at least one of the one or more second data events or the one or more second metrics.

18. The method of claim 17, further comprising:
    causing, by the one or more processing circuits of the analytics system, a user interface of a first user device to display the first dashboard, wherein the first user device is associated with the first content provider; and
    causing, by the one or more processing circuits of the analytics system, a user interface of a second user device to display the second dashboard, wherein the second user device is associated with the second content provider.

19. One or more computer readable storage media comprising instructions that, when executed by one or more processors, cause the one or more processors to:
    receive one or more first data events associated with first content of a first content provider and one or more second data events associated with second content of a second content provider, wherein a publisher platform publishes content of the first content provider and the second content provider;
    generate multiplexed data by multiplexing the one or more first data events and the one or more second data events; and
    communicate the multiplexed data to a de-multiplexer of an analytics system, wherein the de-multiplexer de-multiplexes the multiplexed data into the one or more first data events and the one or more second data events, communicates the one or more first data events to a first endpoint associated with the first content provider, and communicates the one or more second data events to a second endpoint associated with the second content provider.

20. The one or more computer readable storage media of claim 19, wherein the publisher platform causes a plurality of user devices to provide the first content and the second content to a user;
    wherein the one or more first data events and the one or more second data events are generated by the plurality of user devices based on interactions with the first content and the second content via the plurality of user devices.

\* \* \* \* \*